United States Patent [19]

Crabtree et al.

[11] Patent Number: 4,604,690
[45] Date of Patent: Aug. 5, 1986

[54] DYNAMIC CONFIGURATION FOR ADDED DEVICES

[75] Inventors: Robert P. Crabtree, Colleyville; Keith F. Kelly, Jr., Dallas, both of Tex.

[73] Assignee: International Business Machines Corp., Armonk, N.Y.

[21] Appl. No.: 771,801

[22] Filed: Sep. 3, 1985

Related U.S. Application Data

[63] Continuation of Ser. No. 468,514, Feb. 22, 1983, abandoned.

[51] Int. Cl.4 .............................................. G06F 9/00
[52] U.S. Cl. .................................................. 364/200
[58] Field of Search ... 364/200 MS File, 900 MS File

[56] References Cited

U.S. PATENT DOCUMENTS

| | | |
|---|---|---|
| 3,787,816 | 1/1974 | Hauck et al. ........................ 364/200 |
| 3,812,468 | 5/1974 | Wollum et al. ..................... 364/200 |
| 4,075,693 | 2/1978 | Fox et al. ............................ 364/200 |
| 4,077,058 | 2/1978 | Appell et al. ....................... 364/200 |
| 4,266,271 | 5/1981 | Chamoff et al. .................... 364/200 |
| 4,292,669 | 9/1981 | Wollum et al. ..................... 364/200 |
| 4,442,504 | 4/1984 | Dummermuth et al. ........... 364/900 |
| 4,443,861 | 4/1984 | Slater .................................. 364/900 |
| 4,455,621 | 6/1984 | Telley et al. ........................ 364/900 |

*Primary Examiner*—Thomas M. Heckler
*Attorney, Agent, or Firm*—C. Lamont Whitham; James H. Barksdale; Thomas F. Galvin

[57] ABSTRACT

A method of on-line reconfiguring a data processing system for an added input/output (I/O) device. A configuration program is called and menus are presented. Based on menu selections, the program causes a device definition to be built. The built definition is used to construct a control block which is written into main storage during system operation such that the added device is available for use on a real time basis.

7 Claims, 2 Drawing Figures

DYNAMIC CONFIGURATION FOR ADDED DEVICES

CROSS-REFERENCE TO RELATED APPLICATION

This application is a continuation of application Ser. No. 468,514, filed Feb. 22, 1983, now abandoned.

TECHNICAL FIELD

This invention relates generally to adding devices to a data processing system, and more specifically to a method of dynamically reconfiguring the system during operation such that the added devices are immediately available, for use by the system.

BACKGROUND ART

Adding devices in today's environment to a data processing system made up of a multi-ported computing installation typically involves intricate detail and elaborate operations. The use of the term adding is not meant to include a physical hardware connecting operation. In fact, it is to be assumed that a preliminary operation has been performed and to-be-added devices are already cable connected and/or plugged in. With this in mind, the term adding is meant to include the operation of defining the devices to the operating system in use by the processing system such that the devices can be used by the operating system. In addition to defining new devices, also contemplated is the redefining of existing devices. The devices contemplated include keyboard-/display input/output (I/O) terminals, direct access devices, tape units, printers, card readers, card punch units, etc.

FIG. 1 depicts the intricate detail and elaborate operations mentioned above. Included are system programmer operations of writing detailed source code statements defining a device to be added or redefined and also the related control units and channels to be affected by the device, compiling the source code statements, and combining the resulting object code modules with other operating system components to generate a new operating system base. These operations are depicted by blocks 1, 2 and 3, respectively. The process encompassed in blocks 1-3 is often referred to as a system generation or SYSGEN operation. Because of the complexity of this process, there is a probability that mistakes will occur and it is usually prudent to subject the new operating system base to a degree of testing, as indicated by block 4, prior to its use in a production environment. This testing time represents time in which the computing installation or system is not available for its normal purpose.

At a very minimum, it is necessary to reload and reinitialize the operating system, as indicated by block 5, before the added or redefined device can be used. If the operating system, due to a mistake or whatever reason, fails to accept the definition, the system programmer operations must be repeated. Not only is system programmer time and effort costly, the effects of a down system can be disastrous.

One solution in attempting to eliminate the need for the SYSGEN operation is to predefine large numbers of potential devices at specific addresses. However, there are practical upper limits on the number of each device type which can be defined in this way. Also, device addresses must then be changed when new features are added to the devices. Further, and more importantly, the resources which are required in the operating system to define all unused devices are wasted from the time of the initial system installation until the time devices are actually physically attached.

The above is prior art only in a background sense, and as such, falls short of either anticipating or rendering the instant invention obvious. More specifically, the instant invention presents an advance over any known prior art in that a system can be reconfigured on-line and on a real time basis for a previously undefined device which is to be added. Further, the instant invention presents an advance in that the added device is instantly available for use by the system.

DISCLOSURE OF THE INVENTION

A unique method of reconfiguring a system for an added or redefined device is provided in order to eliminate (1) the need for a system programmer having to construct complex detailed device, and related control unit and channel, definitions, and having to encode the definitions as source statements as inputs to a system generation compiler program, (2) remaining time and resource consuming SYSGEN tasks, (3) loss in time and resources resulting from disruption caused by subsequent testing operations, and (4) disruption and inconvenience caused by having to reload and reinitialize an operating system being used by the data processing system.

The method includes calling a configuration program which causes menus to be presented to a display terminal. Selections are made from the menus and the menus are keyed to. Alternatively, the configuration program could obtain the same information from an input file, data file, or any other source which might be consistent with the normal operation of the computing system.

Based on the selections and keying at the display terminal or from alternate input provided, the program causes a device definition to be built for a device to be added to the operating system. The program also builds definitions for any related control units and channels implied or required by the device definition. The definitions are then stored in a control block section of system main storage where they are available for immediate use by the operating system. The definitions are also written in, or on, a secondary store, such as a disk, along with a catalog or file of other device definitions.

Because the configuration program is in a position to structure, restrict, and check the built device definitions and because the remainder of the operating system supervisor is unaffected by addition or redefinition of a device, the need for any testing is substantially reduced, if not eliminated. Also because the device is immediately available to the system, the need to reload and reinitialize the operating system is eliminated.

BEST MODE FOR CARRYING OUT THE INVENTION

Figure 1:
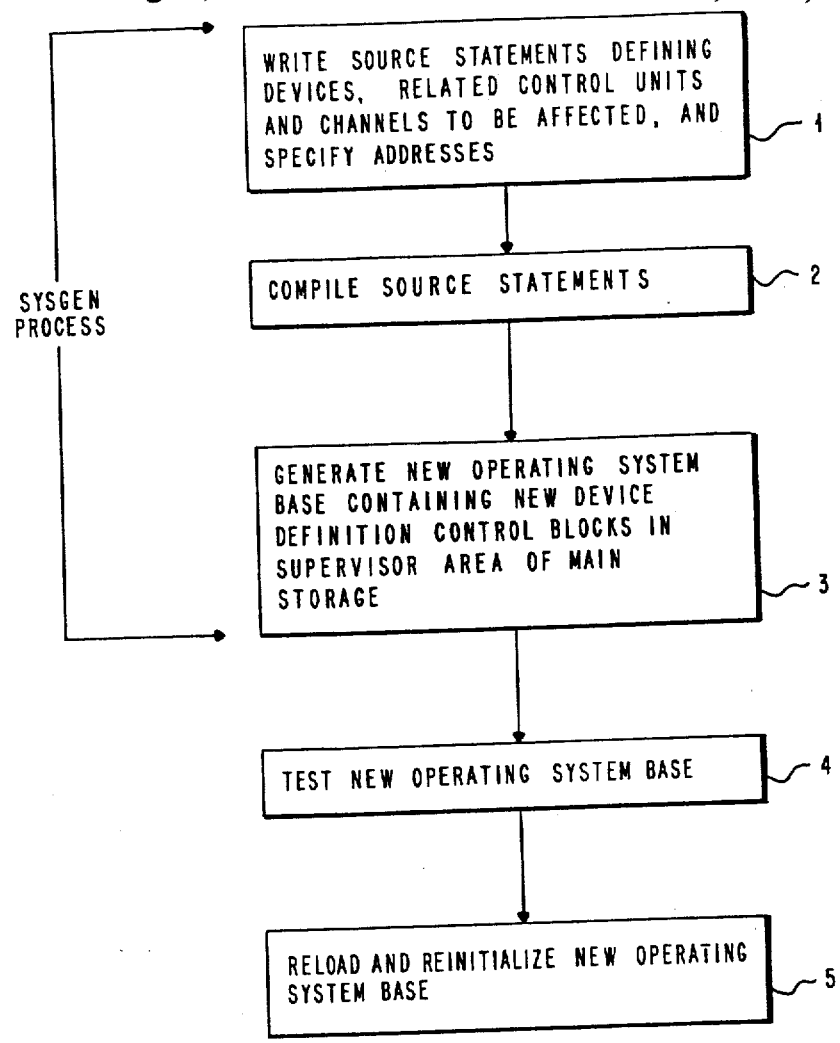
FIG. 1 is a block diagram illustrating prior art chores necessary in reconfiguring a system for an added device.
Figure 2:
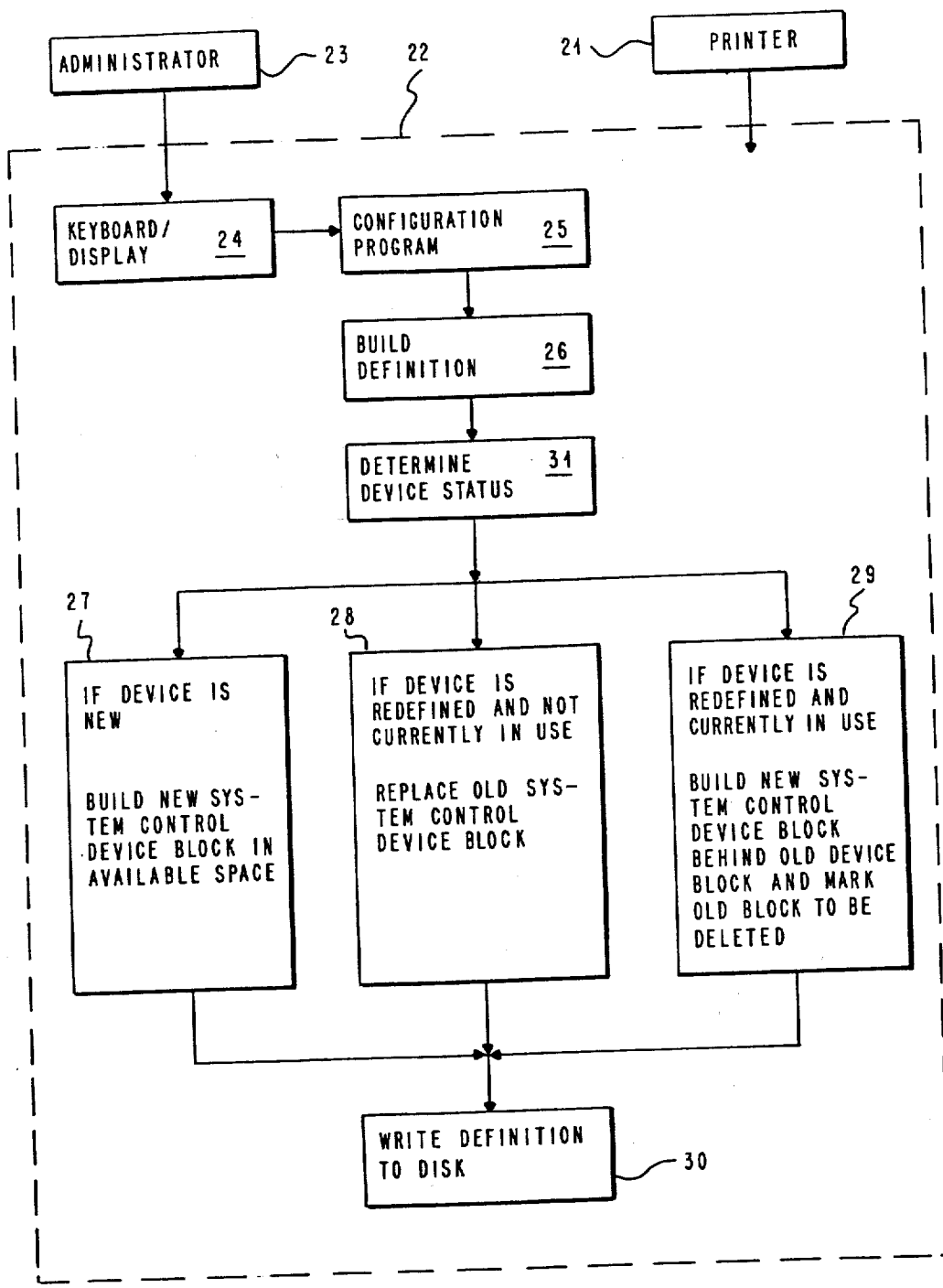
FIG. 2 is a block diagram illustrating the method of this invention for adding a printer to a system.

For a more detailed understanding of the invention, reference is made to FIG. 2. First, it is to be assumed that a newly available printer 21 is to be added to a data processing system 22 and utilized by an in-use operating system. After printer 21 has been cable connected to system 22, a system administrator 23 will use a keyboard/display I/O terminal 24 and call a configuration program 25. Program 25 causes a menu and/or screen presentation to administrator 23. Based upon menu selections and screen keying by administrator 23, a definition for printer 21 is built by program 25. The limited keying contemplated by administrator 23 includes a device address, selection of a device type, and a new or redefined device status. Program building of definitions, etc., based on menu selections and screen keying is well within the skill of one in the art. As such, details of such a program have been omitted for purposes of conciseness and clarity.

A control block is constructed to represent the device to operating system 22. This constructed block is either added to existing control blocks in main storage, or is used to replace an existing block. These operations are represented by blocks 27 and 29, and 28, respectively. More specifically, if printer 21 is new, a new control block is built. If printer 21 is redefined, and is not in use (allocated) at the time of the redefinition, the old control block is replaced or written over with the newly constructed control block. If the device is redefined and is in use at the time of the redefinition, a new control block is built and placed behind the old control block, and the old control block is marked in such a way that when the device is no longer being used, the old control block will be deleted.

The new or redefined status of printer 21 is initially determined by administrator keying. Prior to building a control block, this status is determined as represented by block 31. Status determination also extends to use and non-use of a redefined device. That is, if printer 21 is being redefined and is not currently in use, this use status will determine, as set out above, that the old control block is to be written over or replaced with the newly built control block. The marking of the old control block can be by setting a particular bit or series of bits which are recognizable by the operating system for causing the old control block to be deleted when its associated device is unallocated or no longer in use.

The built definition for printer 21 is also stored on a disk 30 as part of a catalog or file of other device definitions for devices in use by operating system 22. This permits the device definitions to be recreated in event of a power down situation, or any other occurrence where the contents of main storage are erased or lost. Also, the disk file is updated as necessary by the operating system to cause the disk file to match the control block section of main storage. This is a normal operating system capability and is initiated for purposes of this invention based on device status as discussed above.

As with program building of definitions, the building and storing of control blocks in main storage is well within the skill of one in the art. As such, further detail is not considered warranted.

From the above, the major prior art management problems of system downtime and wasted responses are overcome. A system can now be dynamically reconfigured, during operation, for an added device, and the added device is immediately available for use by the system.

In summary, a unique method of reconfiguring a system for an added device is provided. The method includes calling a configuration program which causes menus to be presented to a display terminal. Based on menu selections and other keying at the display terminal, the program causes a device definition to be built for a device to be added to the system. The program also builds definitions for any related control units and channels implied or required by the device definition. The definitions are then stored in a control block section of system main storage. The definitions are also written into, or onto, a secondary store for control block recreation in the event of a power down situation.

While the invention has been particularly shown and described with reference to a preferred embodiment, it will be understood by those skilled in the art that various changes in form and detail may be made without departing from the spirit and scope of the invention.

We claim:

1. A method of on-line reconfiguring a data processing system for an added or redefined device, said method comprising:
   (a) building a definition for said device based on input to a configuration program;
   (b) determining a status of said devices as being new, redefined and not currently in use, or redefined and currently in use; and
   (c) building and storing a control block in main storage for said data processing system if said defined device is new, building a redefined control block and replacing a control block for the device in main storage if said device is redefined and not currently in use, or building a redefined control block and storing it in main storage to be substituted at a later time if said device is redefined and currently in use, all said building, storing or replacing steps being performed during the operation of said data processing system.

2. A method according to claim 1 including writing said redefined control block behind said control block for said device being redefined if said device being redefined has a status of being used.

3. A method according to claim 2 including marking said device control block for said device being redefined.

4. A method according to claim 3 including deleting said device control block for said device being redefined when said device being redefined has a status of being no longer in use.

5. A method according to claim 4 including storing said device definition in a secondary store.

6. A method according to claim 5 including updating said secondary store to include an updated catalog of definitions of devices in use by said system.

7. A method according to claim 1 including replacing said control block for said device being redefined by writing over said control block for said device being redefined with said redefined control block.

* * * * *